Figure 1:
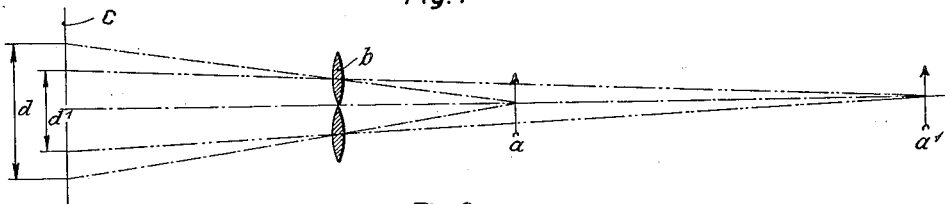

May 16, 1933. W. THORNER 1,909,731
METHOD OF AND APPARATUS FOR TAKING AND PROJECTING MULTIPLE
IMAGES SUCH AS ARE USED IN COLOR PHOTOGRAPHY
Filed Oct. 23, 1930

Inventor
Walther Thorner
by Frank Reichold
Attorney

Patented May 16, 1933

1,909,731

UNITED STATES PATENT OFFICE

WALTHER THORNER, OF BERLIN, GERMANY

METHOD OF AND APPARATUS FOR TAKING AND PROJECTING MULTIPLE IMAGES SUCH AS ARE USED IN COLOR PHOTOGRAPHY

Application filed October 23, 1930, Serial No. 490,690, and in Germany October 30, 1929.

My invention relates to improvements in the method of and apparatus for taking and projecting multiple images such as are used in color photography.

When taking multiple photographs such as are used in color photography of moving subjects by means of several objectives a succession of sets of photographs is produced on the negative film and the distance at which the multiple images of a given moving object are spaced apart will vary, from set to set, according to the distance at which the subject is remote from the camera at the instance of exposure, and in the taking of the pictures or in the projection thereof it is necessary to compensate this irregularity in order to insure registry of the images upon the screen, for which purpose either in the taking of the pictures the objectives are moved more or less towards and away from each other, or the optical system is adjusted in the projection of the pictures. The first named method is practically difficult by reason of the small size of the objectives and their slight relative distances, and the second method requires continuous attention of the attendant during the projection.

The object of the improvements is to provide a method in which the said difficulties are obviated, and with this object in view my invention consists in compensating the varying distances of the images upon the negative while making the positive from the negative, the negative being printed in such a way that in the positive the relative distances of the images are exactly alike in all the successive sets. Theoretically such reproduction of the negatives might be made by successively printing the photographs of each set while shifting the negative relatively to the film upon which the print is being made, so that in the positive the images have the correct distances. Practically however I make use of an optical printing apparatus comprising an objective adapted simultaneously to reproduce all the images of each set, and I adjust the optical system and the films relatively to each other, so that the ratio of the projection is varied in such a way that the relative distances of the images of a given moving subject on the positive film are alike even if the relative distances of the images of the successive sets on the negative film are different. Since the differences in the said ratio are small I prefer to use a printing apparatus by means of which the negative is reproduced on the positive film in the same size, in which case the objective is located at the middle between the negative and positive films, the distance between the objective and the said films being $2f$. In such systems the compensation is effected by slightly shifting the objective in the direction of the optical axis without impairing the sharpness of definition.

For the purpose of explaining the invention an apparatus suitable for making a positive film from a negative has been illustrated in the accompanying drawing in which the same reference characters have been used in all the views to indicate corresponding parts. In said drawing, Fig. 1 is a diagram illustrating the taking of multiple images from objects located different distances away from the objective, Fig. 2 is a diagrammatical elevation showing a copying apparatus, Fig. 3 is a diagrammatical plan view of Fig. 2, and Fig. 4 is an elevation on an enlarged scale showing the negative film and the marks made thereon.

When taking multiple pictures from a subject $a$ located near the objectives $b$ the negative images of that subject produced on the film $c$ are separated one from another at a distance $d$, and when taking multiple pictures from a subject $a'$ located at a large distance from the objectives the images on the negative film are separated one from another at the distance $d'$. It will therefore be understood, that in such case when making a positive from the negative and projecting the same on the screen there will be failure of registry as between successive sets of images projected upon the screen. It will however be understood that registry as between successive sets of images will be obtained if the images projected from the negative upon the positive film are so corrected in position that the distances d and d' on the said positive film are alike.

Figure 2:
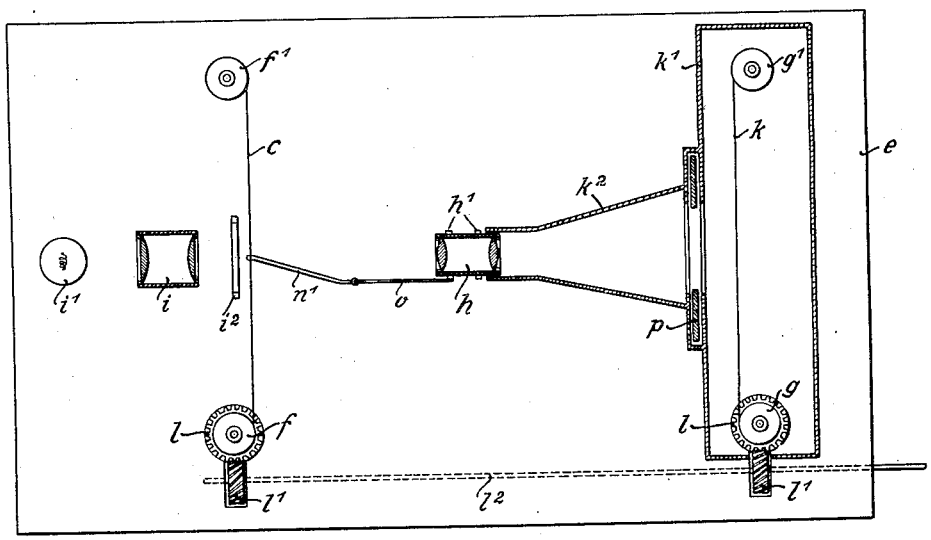
Figure 3:
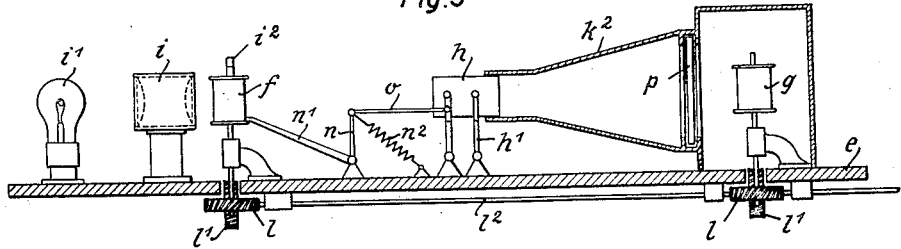
Figure 4:
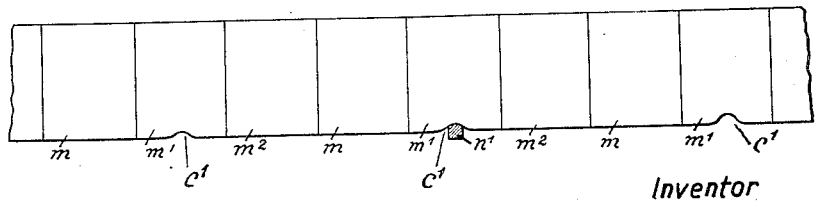

In Figs. 2 and 3 I have illustrated an apparatus for making a positive from the negative film. The apparatus comprises a plate e having spools f, f¹, g and g¹, an objective h, a condenser i, a source of light i¹ and a translucent plate i² mounted thereon. On the spools f, f¹ the negative film c is trained and on the spools g, g¹ the positive film k. The positive film is located within a casing k¹ having a tubular extension k² in which the objective h is shiftable. The objective is mounted on arms h¹ rockingly supported on the plate e and providing a parallel guide for the objective h. To the spools f and g intermittent rotary movement is imparted from a suitable source (not shown) by means of helical gear wheels l and l¹ and a shaft l². The objective h is adapted to be shifted in the direction of the optical axis for compensating the difference in the distance between the multiple images upon successive portions m, m¹ and m² of the negative film. Preferably each set of multiple images is equipped with marks of dimensions corresponding to the distance between the subject and the camera, so that the objective h may be adjusted in axial direction in accordance with the said distance and the distance d, d¹ between the multiple images upon the negative, so that upon the positive film the multiple images shall be spaced at correct and uniform distance. Preferably the said marks cooperate with mechanism for automatically shifting the objective. In the example shown in the drawing and more particularly in Fig. 3, the said mechanism comprises a bell crank lever n, n¹ rockingly mounted on the plate e and having its arm n connected by a link o with one of the arms h¹. As is shown in Fig. 4 the marks on the negative are in the form of marginal cut-out portions c¹ for each group of images m, m¹ and m², and the said cut-out portions are engaged by the arm n¹ of the bell crank lever, a spring n² being provided for holding the arm n¹ in engagement with the margin of the negative film. The said cut-out portions are made more or less deep according to the distance of the object.

In the operation of the apparatus the negative film c is wound on the spool f¹ and attached to the spool f, and the sensitized positive film k is wound on the spool g¹ and attached to the spool g, the negative film c being in the position with the first set of multiple images between the objective h and the illuminating system i, i¹, i². The bell crank lever n, n¹ engages the cut-out portion c¹ of the set of pictures thus setting the objective in the proper position axially of its optical axis. Now an exposure is made by opening a shutter p. After closing the shutter the films c and k are advanced one step by means of the mechanism l, l¹, l², so that the second set of multiple pictures and the next portion of the positive film k get into exposing position. Now the arm n¹ of the bell crank lever n, n¹ again engages the cut-out portion c¹ of the second set of pictures, and if the said cut-out portion is deeper than that of the first set of pictures the objective h is shifted in axial direction. After all the pictures have thus been reproduced the positive film is taken from the casing k¹ and developed. Now all the successive sets of photographs m, m¹, m² bear multiple images of the moving subject which are uniformly spaced, so that in the projection exact registry of the images upon the screen is insured.

By placing the objective h in the middle between the films c and k and at the distance 2f from each film the pictures produced on the film k are equal in size to the pictures on the negative film c, and it is possible by minutely shifting the objective h in the direction of the optical axis to vary the ratio of the transmission of the pictures from the negative to the positive film within the slight limits required for compensating inaccuracies in the relative distances of the pictures on the negative film, and when thus shifting the objective h the sharpness of definition is not impaired.

For example, if a set of multiple images comprises four images produced on the surface of an ordinary film picture by means of objectives of a focal distance of 25 millimeters, and the smallest distance between the objectives and the object is 1,50 meters, the distance between the images of the set taken from an object located at a distance of 1,50 meters from the objective is 12,2 millimeters, while the distance of the pictures taken from an object located far away from the objective is 12 millimeters. For compensating the difference of the said distances, viz. 0,2 millimeter, the ratio of the reproduction of the negative pictures on the positive film which is 120:120 for multiple pictures taken from remote objects must be changed to 122:120 for pictures taken from objects located 1,50 meters away from the objectives. If the objective used in the copying apparatus has a focal distance f=60 millimeters the normal distance between the said objective and both films c and k must be 120 millimeters, and the objective must be shifted one millimeter in the direction of the optical axis and towards the positive film k for reproducing the set of multiple pictures taken from objects located near the objective. In this case the ratio of the distances between the objective and the films c and k and therefore the ratio of the reproduction will be 121 to 119, which is practically equal to 122:120.

While in describing the invention reference has been made to an example embodying the same and an apparatus suitable for carrying out the method I wish it to be understood that my invention is not limited to the method described herein and the apparatus illustrated in the drawing, and that various changes may be made in the method and the construction of the apparatus without departing from the invention.

I claim:

1. The herein described apparatus for printing multiple picture films, comprising means for feeding the negative film and the positive film parallel to each other and in spaced relation, an objective between said means in position for transmitting simultaneous images from the negative film to the positive film, a negative film whose successive portions bear sets of multiple photographs in which the images of particular subjects vary in spacing and automatic means for shifting such film-feeding means and objective relatively to one another in the direction of the optical axis of said objective according to variation in the image spacing upon said negative film.

2. The herein described apparatus for printing multiple picture films, comprising means for feeding the negative film and the positive film parallel to each other and in spaced relation, an objective between said means in position for transmitting simultaneous images from the negative film to the positive film, a negative film borne by said means whose successive portions bear multiple images of varying spacing, such negative film being further provided in each successive portion with means of variable value as between successive portions and a value in accord with the image spacing upon each portion, said objective being located substantially at the middle between said films, and automatic means operated in response to variation in the value of such film-borne means for shifting said film-feeding means and objective relatively to one another in the direction of the optical axis of said objective.

3. The herein described apparatus for printing multiple picture films, comprising means for feeding the negative film and the positive film parallel to each other and in spaced relation, an objective between said means in position for transmitting simultaneous images from the negative film to the positive film, a negative film borne by said means whose successive portions bear multiple images of unequal spacing and cuts of varying depth, the depth of cut corresponding to the image spacing, the distance between said objective and both films being substantially equal to the double focal distance of the objective, and means automatically responsive to the varying depth of the cuts of successive portions of the negative film, for shifting said film-feeding means and objective relatively to one another in the direction of the optical axis of said objective.

4. In motion picture photography the method herein described of preparing a positive film for the projecting upon a screen of a motion picture in colors which consists in producing by a camera in negative upon a continuous film a succession of sets of multiple photographs in which variation in the distance of a moving subject from the camera is expressed in variation in the spacing of the multiple images of said subject in the constituent photographs of successive sets, and in projecting by adjustable apparatus upon a second continuous film the succession of photographs and in so doing making adjustment of such apparatus according to variation in the spacing of the multiple images upon the negative film, thereby producing (after development) upon the second film a print upon which the multiple images of such moving object are uniformly spaced from set to set, and then developing the second film.

5. In motion picture photography the method herein described of producing upon a screen a sharply defined motion picture in colors which consists in producing by a camera in negative upon a continuous film a succession of sets of multiple photographs in which differences in the distances of a subject from the camera are expressed in differences in the spacing of the multiple images of said subject in the constituent photographs of the successive sets, in producing from the film first-named in positive upon a second continuous film a succession of sets of multiple prints in which the spacing of the images of the subject in the constituent prints of successive sets is uniform, and making projection upon the screen from such second film.

6. The method herein described of preparing a positive film for the projection upon a screen of a moving picture in colors, which consists in directing upon a moving object a camera equipped with a plurality of simultaneous lenses, and exposing within the camera and at successive instants of time successive areas of a continuous sensitive film, and thereby producing (after development) a corresponding succession of plural simultaneous views of the object in negative, the spacing of the simultaneous images of the moving object varying throughout the succession, according to the distance of the object from the camera, developing the so exposed film, projecting optically, and at successive instants of time, upon successive areas of a second continuous sensitive film, the succession of simultaneous views, and in the interval between successive projections adjusting the optical printing apparatus in accordance with variation in the spacing of the simultaneous images of the object, and thereby producing (after development) a positive with uniformly spaced simultaneous images of the object, and then developing the second film.

In testimony whereof I hereunto affix my signature.

WALTHER THORNER.